United States Patent
Holmes et al.

(10) Patent No.: US 8,211,199 B2
(45) Date of Patent: Jul. 3, 2012

(54) FILTER CARTRIDGE

(75) Inventors: Lester E. Holmes, Southaven, MS (US); Randel D. Harbur, Germantown, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 579 days.

(21) Appl. No.: 12/400,206

(22) Filed: Mar. 9, 2009

(65) Prior Publication Data

US 2009/0230051 A1 Sep. 17, 2009

Related U.S. Application Data

(60) Provisional application No. 61/035,458, filed on Mar. 11, 2008.

(51) Int. Cl.
*B01D 46/00* (2006.01)
(52) U.S. Cl. .......................... 55/498; 55/502
(58) Field of Classification Search ............... 55/337, 55/459.1, 482, 497–498, 501–503, 521, 355, 55/511, 524, 507, 514, 519, 525; 210/488, 210/497.01
See application file for complete search history.

(56) References Cited

U.S. PATENT DOCUMENTS

| 3,058,279 | A | | 10/1962 | Metcalfe |
| 3,353,341 | A | | 11/1967 | Stripp |
| 3,423,909 | A | | 1/1969 | Bennett et al. |
| 3,481,119 | A | | 12/1969 | McKinlay |
| 5,484,466 | A | * | 1/1996 | Brown et al. ............... 55/498 |
| 5,569,311 | A | | 10/1996 | Oda et al. |
| 5,795,361 | A | | 8/1998 | Lanier, Jr. et al. |
| 6,235,194 | B1 | | 5/2001 | Jousset |
| 7,311,748 | B2 | | 12/2007 | Holmes et al. |
| 2006/0151364 | A1 | * | 7/2006 | Hacker ............... 210/91 |
| 2007/0125049 | A1 | * | 6/2007 | Menrik et al. ............... 55/337 |

FOREIGN PATENT DOCUMENTS

WO 9736102 10/1997

* cited by examiner

*Primary Examiner* — Duane Smith
*Assistant Examiner* — Karla Hawkins
(74) *Attorney, Agent, or Firm* — Renner, Otto, Boisselle & Sklar, LLP

(57) ABSTRACT

A filter cartridge (400) with a first end cap (420) comprising a rigid adaptor ring (430) and a seal structure (480). The adaptor ring (430) includes a shelf (440) on which the first axial edge (413) of filtering media (410) sits and a clip (450) situated radially and axially outward from the filtering media (410). The seal structure (480) encapsulates the shelf (440) and a first end portion (415) of the filter media (410). The clip (450) is not encapsulated by the seal structure (480) whereby it is available for insertion into a housing channel.

20 Claims, 11 Drawing Sheets

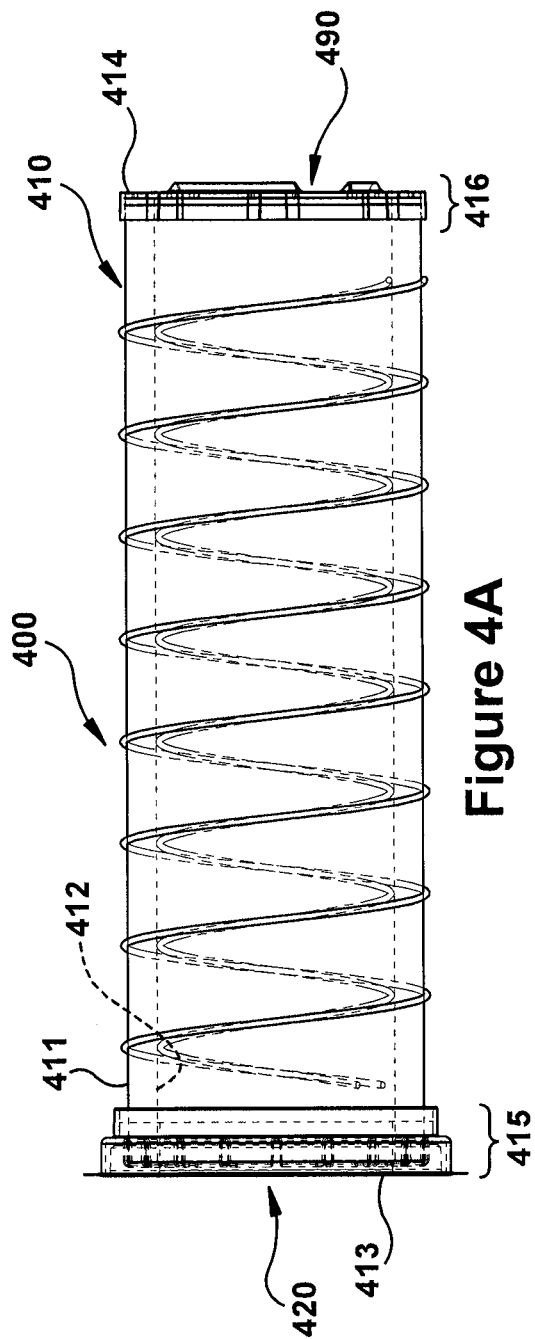
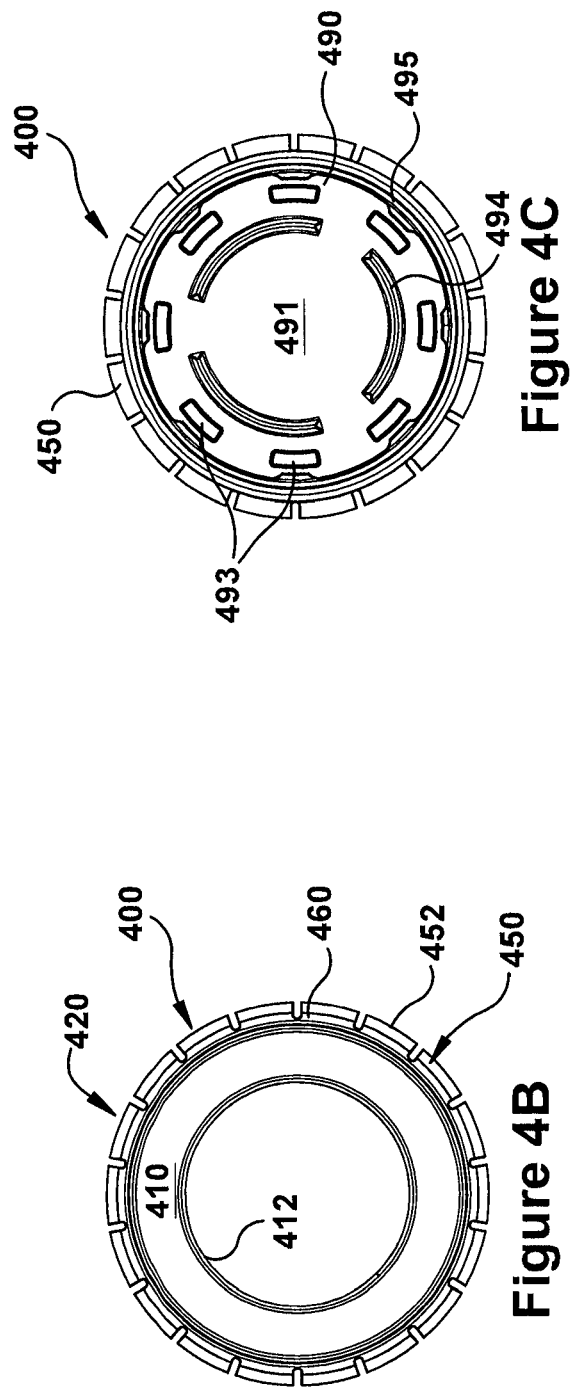

FILTER CARTRIDGE

RELATED APPLICATION

This application claims priority under 35 U.S.C. §119(e) to U.S. Provisional Patent Application No. 61/035,458 filed on Mar. 11, 2008. The entire disclosure of this provisional application is hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

FIELD

A filter cartridge that can function as a secondary filter cartridge in, for example, an air-filtering assembly for an engine.

BACKGROUND

A filter assembly is commonly installed upstream of the air intake of a combustion engine. Such a filter assembly can generally comprise a housing, a primary filter cartridge, and a secondary filter cartridge. During normal operation, air entering the filter assembly must pass through the primary filter cartridge (or more particularly its filtering media), then through the secondary filter cartridge (or more particularly its filtering media), to exit the filter assembly. Thus, only filtered air can exit the filter assembly and pass to the engine.

SUMMARY

A filter cartridge is provided that can function as a secondary filter cartridge in, for example, an air-filter assembly for a combustion engine. The filter cartridge has an end cap that not only seals the respective axial edge of the filtering media, but also mounts and seals the cartridge to the housing independently of the primary filter cartridge. Thus, the filter assembly can be operated with only the secondary filter cartridge, should the primary filter cartridge not be available for one reason or another.

DRAWINGS

FIGS. 4A-4J are various views of the secondary filter cartridge and components thereof.

DESCRIPTION

Figure 1A:
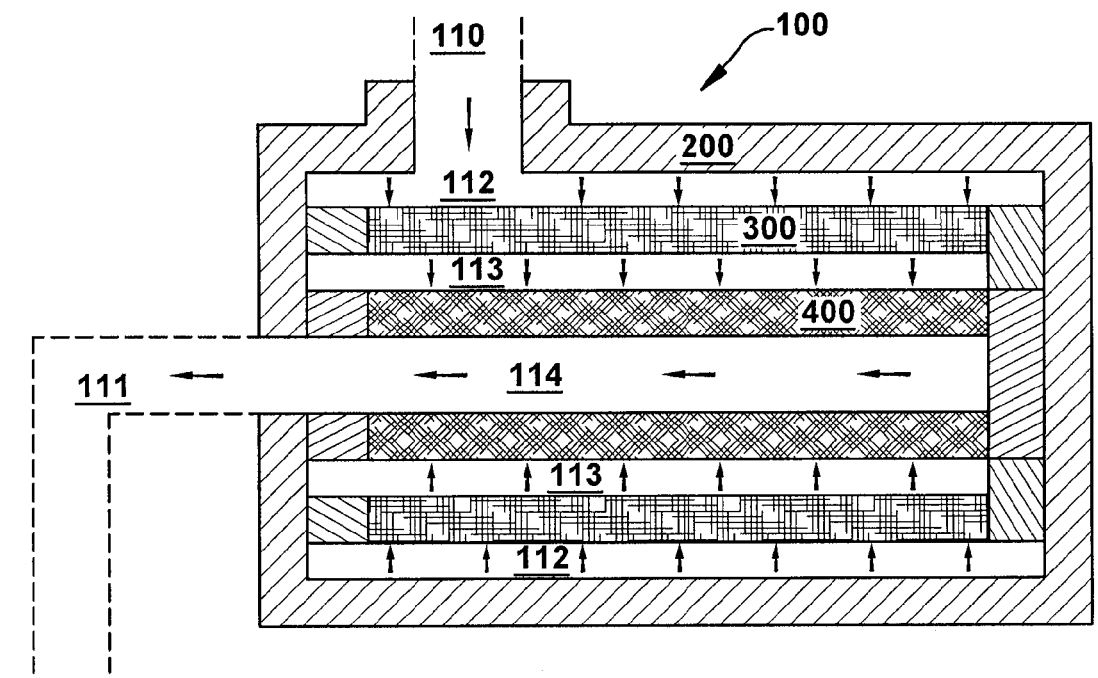
FIGS. 1A-1B are each schematic drawings of the filter assembly, with FIG. 1A showing normal operation with both a primary filter cartridge and a secondary filter cartridge, and FIG. 1B showing emergency operation with only the secondary filter cartridge.

Referring now to the drawings, and initially to FIG. 1A, the filter assembly 100 is schematically shown in normal operation. The filter assembly 100 generally comprises a housing 200, a primary filter cartridge 300, and a secondary filter cartridge 400. In the illustrated embodiment, the filter assembly 100 is installed upstream of the air intake of a combustion engine, and it includes an air entrance 110 (drawing air from the environment) and an air exit 111 (supplying intake air to the engine).

The housing 200 and the filter cartridges 300/400 define an inlet chamber 112 in communication with the entrance 110, an intermediate chamber 113, and an outlet chamber 114 in communication with the exit 111. Air must pass through the primary filter cartridge 300 (or more particularly its filtering media 310 introduced below) to flow from the inlet chamber 112 to the intermediate chamber 113. And air must pass through the secondary filter cartridge 400 (or more particularly its filtering media 310 introduced below) to flow from the intermediate chamber 113 to the outlet chamber 114. Thus, only filtered air can travel through the exit 111 to the engine intake.

Figure 1B:
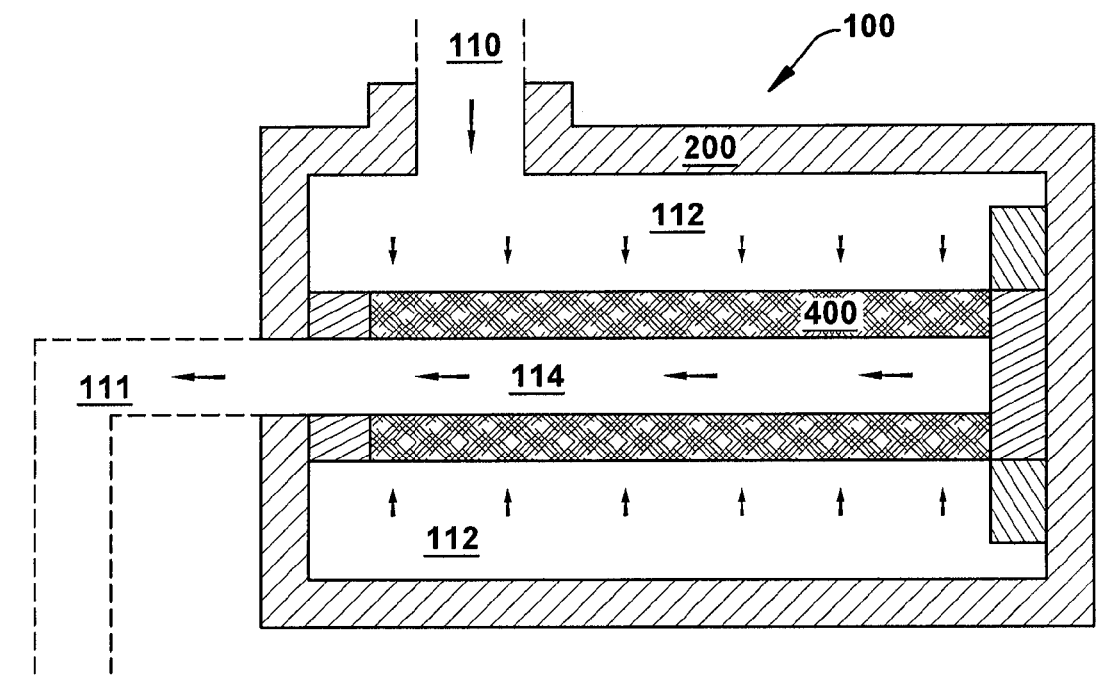
Figure 1E:
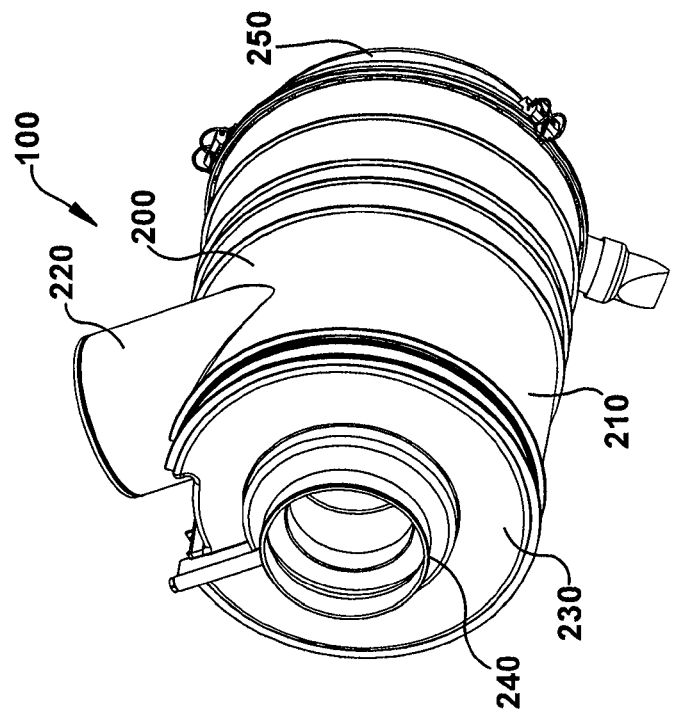
FIGS. 1C-1F are various views of the filter assembly.
Figure 1C:
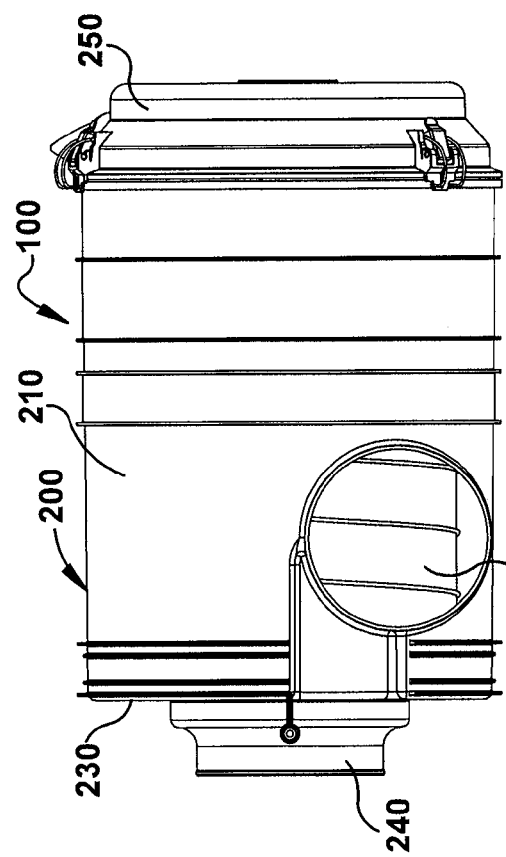
Figure 1D:
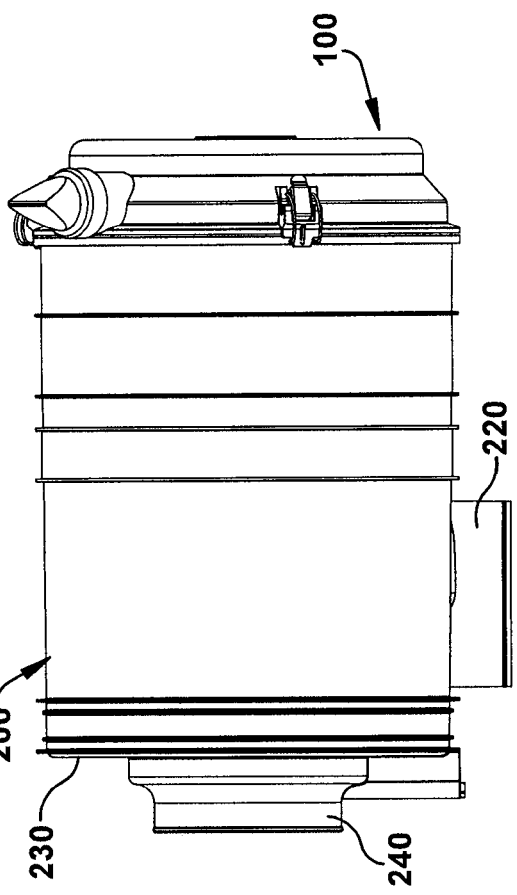
Figure 1F:
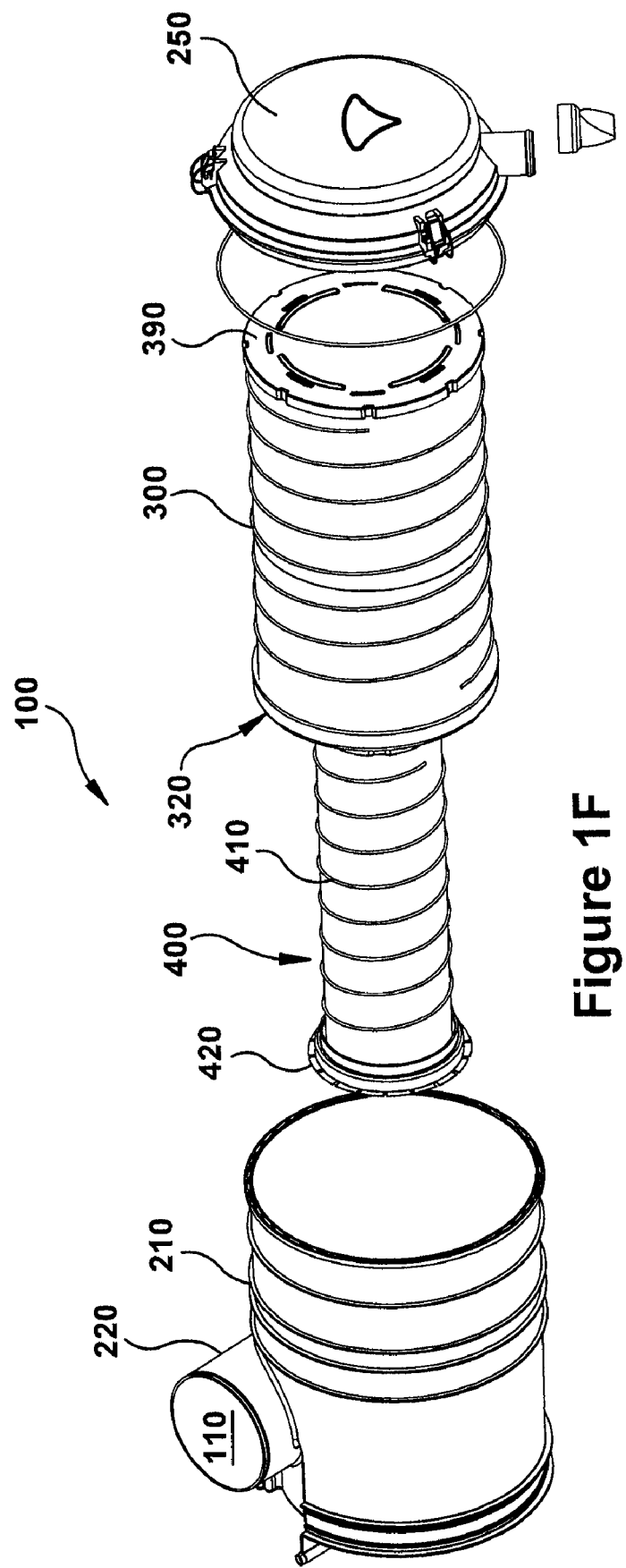

Referring now to FIG. 1B, the filter assembly 100 is schematically shown during emergency operation. In this operational mode, the primary filter cartridge 300 is not available for one reason or another. (For example, it may have become so clogged that air could not reach engine without its removal.) As is explained in more detail below, the secondary filter cartridge 400 is mounted and sealed to the housing 200 independently of the primary filter cartridge 300. Air entering the filter assembly 100 through the entrance 110 must pass through the secondary filter cartridge 400 to flow from the inlet chamber 112 to the outlet chamber 114. Thus, still only filtered air can travel through the exit 111 to the engine intake.

The filter assembly 100 is shown more pictorially in FIGS. 1C-1F. The assembly 100 (and its housing 200 and filter cartridges 300/400) can be viewed as having an axis in the left-right direction and radial dimensions extending therefrom. In the illustrated orientation, the filter assembly 100 has a leftward axial direction corresponding to the air-exit direction (e.g., the direction fluid exits the assembly 100 through the exit 111). For ease in explanation, this leftward direction will be referred to as the first axial direction, and the opposite direction (rightward) will be referred to as the second axial direction. Likewise, when using the modifiers "first" and "second" when describing components of the filter assembly 100, "first" will refer to a leftward feature and "second" will refer to a rightward feature.

In the illustrated filter assembly 100, the housing 200 comprises a sleeve 210, an inlet duct 220, a first cover 230, an outlet duct 240, and a second cover 250. The inlet duct 220 defines the air entrance 110 and the outlet duct 240 defines the air exit 111. The primary filter cartridge 300 is radially centered within the sleeve 220 and the secondary filter cartridge 400 is radially centered therewithin (See FIG. 1F).

In normal operation (as was shown in FIG. 1A), the annular space radially between the sleeve 210 and the primary filter cartridge 300 is the inlet chamber 112, the annular space radially between the primary filter cartridge 300 and the secondary filter cartridge 400 is the intermediate chamber 113, and the cylindrical space inside the secondary filter cartridge 400 is the outlet chamber 114. In emergency one-filter operation (FIG. 1B), the annular space between the sleeve 210 and the secondary filter cartridge 400 is the inlet chamber 112 and the cylindrical space inside the secondary filter cartridge 400 is the outlet chamber 114. (The filter assembly 100 does not have an intermediate chamber 113 during one-filter operation.)

Figures 2A, 2B:
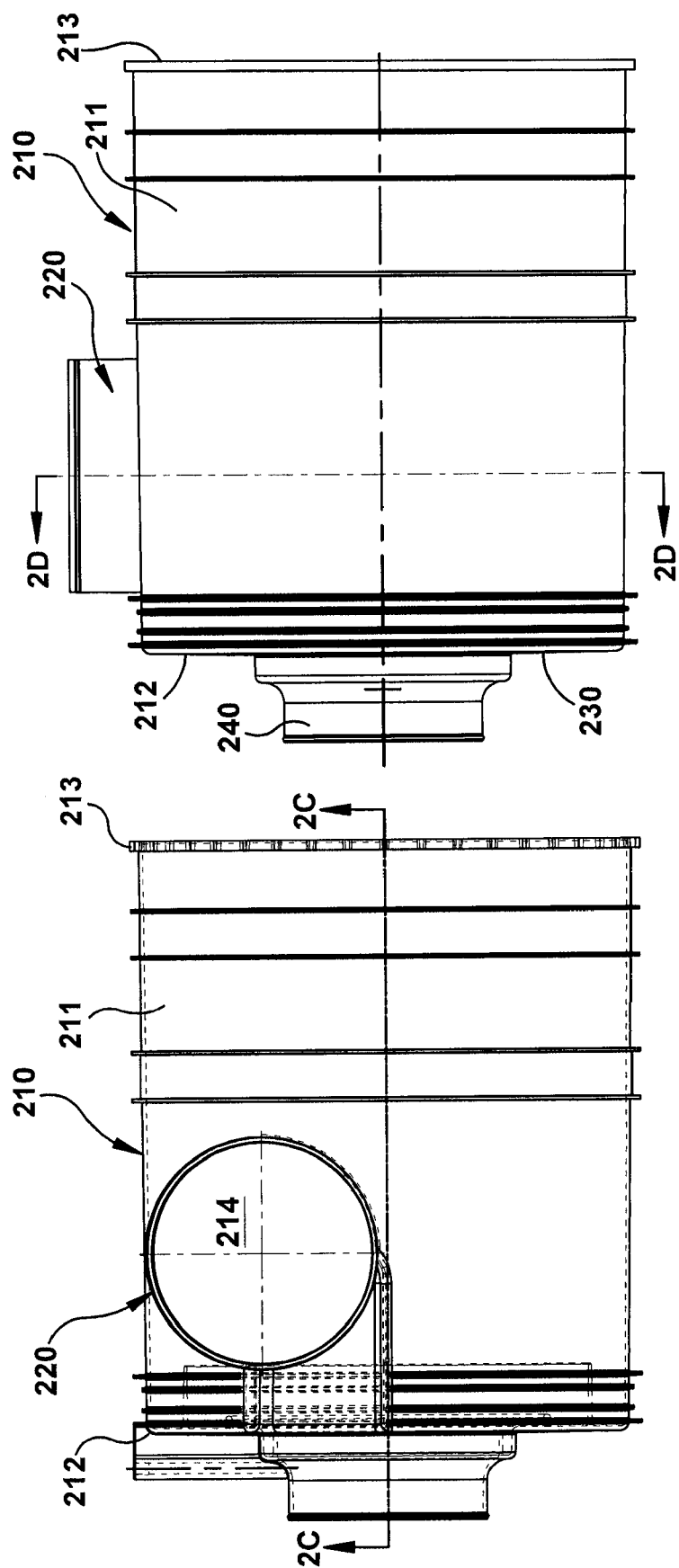
FIGS. 2A-2H are various views of the housing of the filter assembly, and components thereof.

Turning now to the 2$^{nd}$ drawing set (FIGS. 2A-2H), the housing 200 is shown in more detail. The sleeve 210, the inlet duct 220, the first cover 230, and the outlet duct 240 can be formed in one piece, or otherwise attached in a non-removable manner. (FIGS. 2A-2E). The sleeve 200 comprises a cylindrical wall 211 with a first axial edge 212 and a second axial edge 213. (FIGS. 2A-2C.) The wall 211 includes an opening 214 near its first axial edge 212, from which the inlet duct 220 radially projects. (FIGS. 2A-2D.)

Figure 2D:
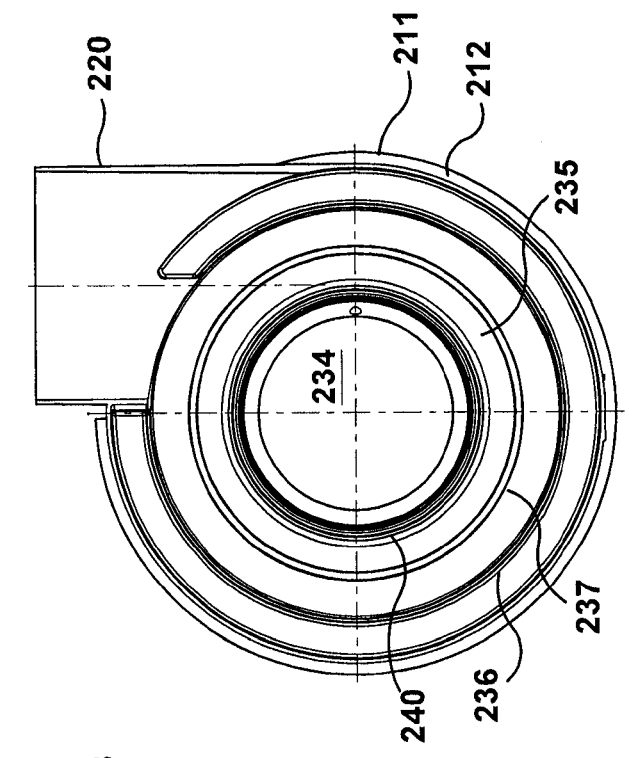
Figure 2E:
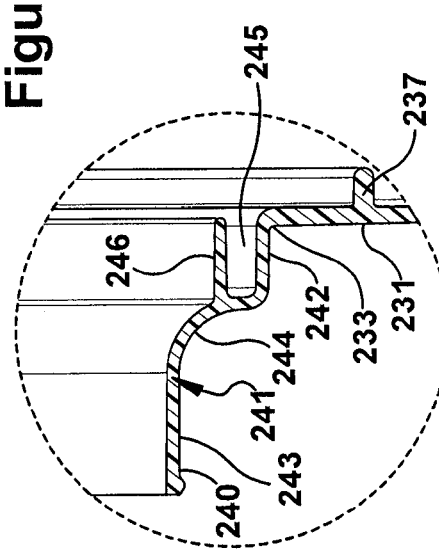
Figure 2C:
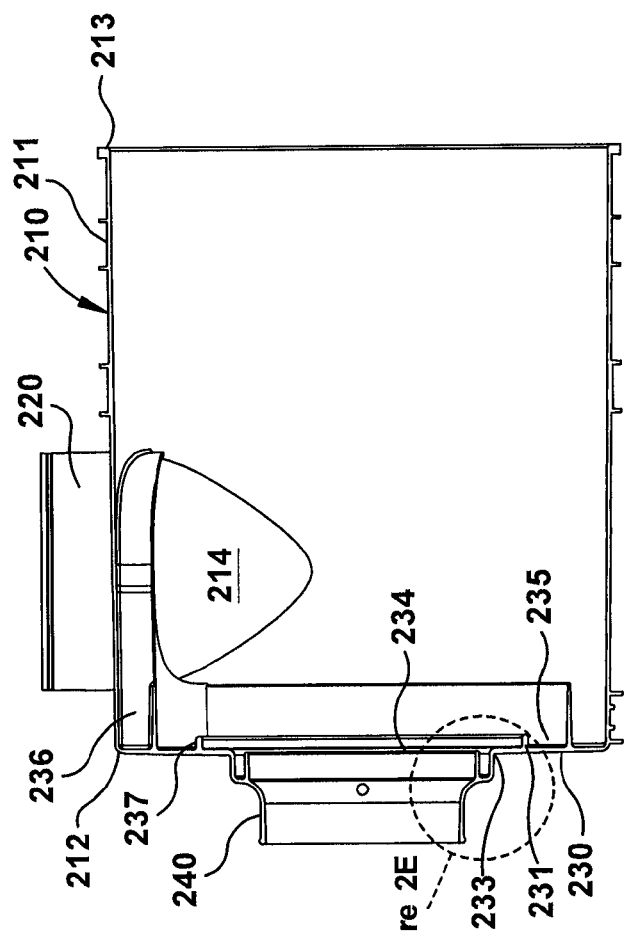

The first cover 230 comprises an annular wall 231 with an outer radial edge attached to the sleeve's first axial end 212 and an inner radial edge that defines an opening 234 (FIGS. 2C-2D.) The cover 230 can include an annular cradle 235 for cooperation with the primary filter cartridge 300. (FIGS. 2C-2E.) In the illustrated cover 230, the primary-filter-cartridge cradle 235 is formed by pedestals 236 and 237, which project axially away from the wall 231 in the second direction. (FIGS. 2C-2E.)

The outlet duct 240 comprises a necked wall 241 having a proximal portion 242, a narrower distal portion 243, and tapered transition portion 244 therebetween. The proximal portion 242 projects axially from the cover's inner radial edge 233 in the first direction, whereby the outlet duct 240 communicates with the cover's opening 234 and the interior of the sleeve 210. (FIGS. 2C-2E.) Referring to FIG. 2E an annular channel 245 is provided for cooperation with the secondary filter cartridge 400 (and more particularly, for receipt of its clip 450 introduced below). The clip-receiving channel 245 can be formed by the proximal wall portion 242, and a circular fence 246 that projects axially from the tapered wall portion 244 in the second direction. (FIG. 2E.)

Figure 2H:
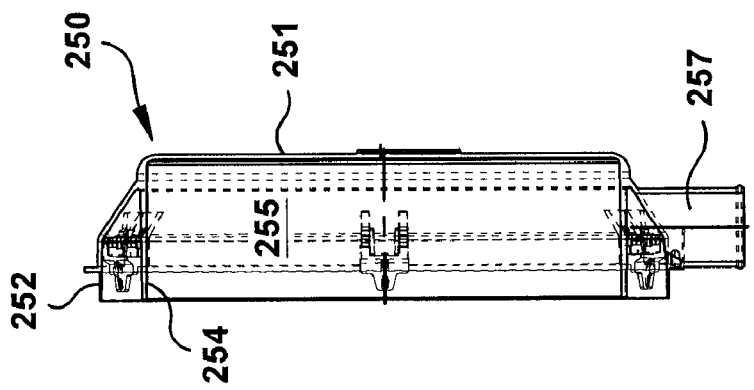
Figure 2G:
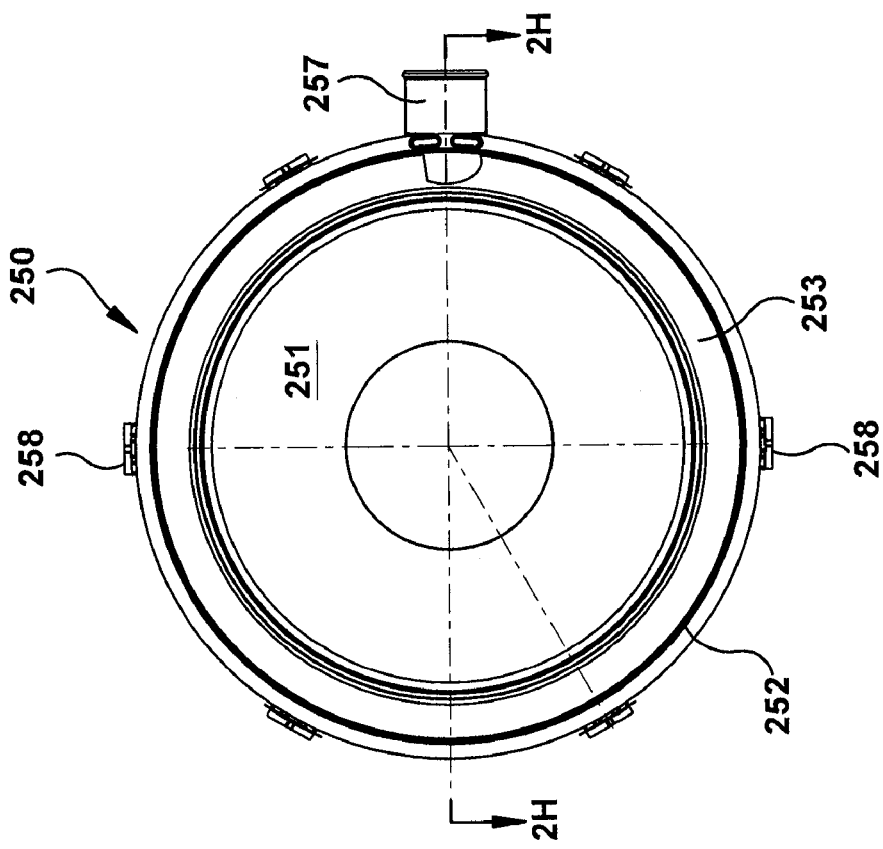
Figure 2F:
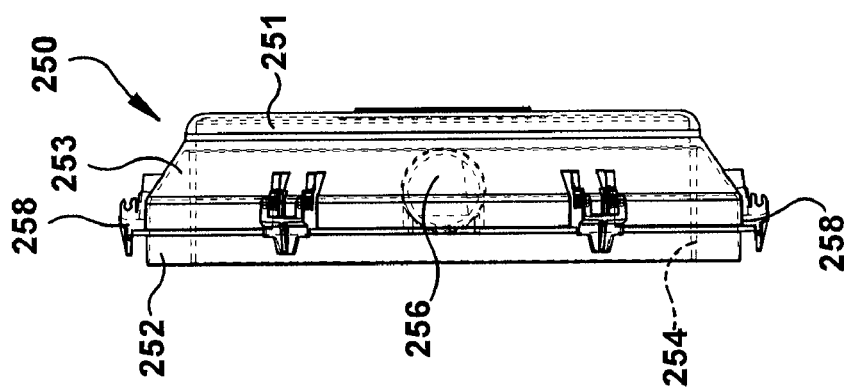

Referring now to FIGS. 2F-2H, the second cover 250 can be removably clamped onto the non-covered end of the sleeve 210. The cover 250 comprises a circular wall 251, a cylindrical wall 252, and a sloped transitional wall 253 therebetween. A circular hedge 254 projects axially from the wall 251 in the first direction to form an insertion pocket 255 for the first filter cartridge 300. The walls 252 and 253 have an opening 256 to which a dust-ejection pipe 257 can be connected. Clamp-holders 258 can be affixed around the circumference of walls 252/253 to hold the clamps (not shown) that removably secure the second cover 250 to the sleeve 210.

Figure 3C:
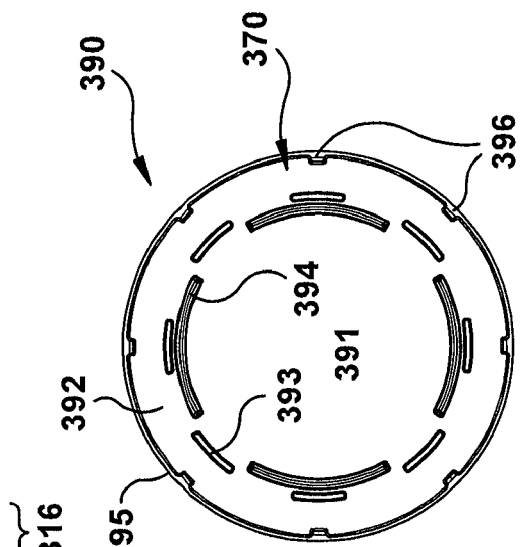
FIGS. 3A-3C are various views of the primary filter cartridge of the filter assembly.
Figure 3A:
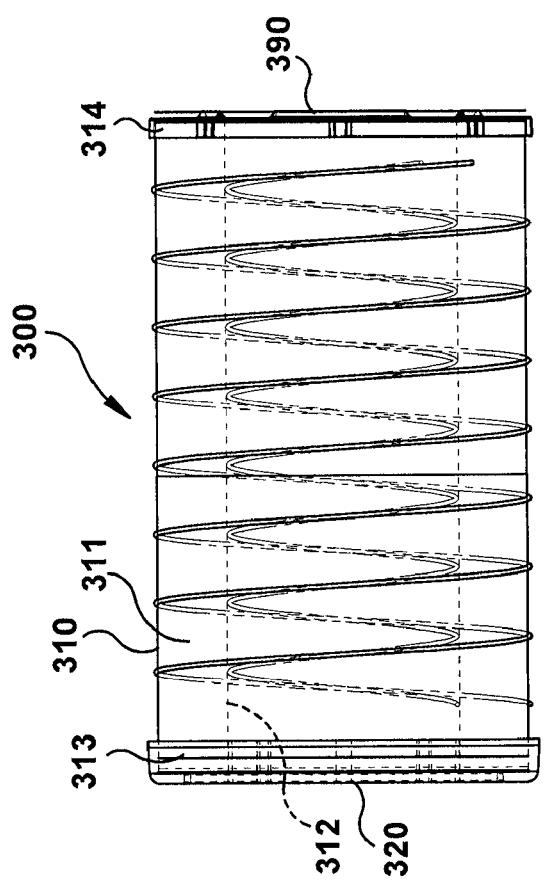
Figure 3B:
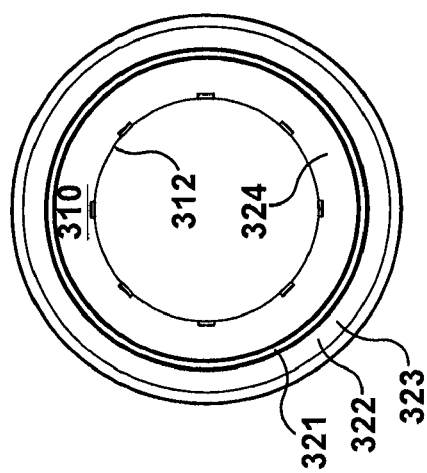

The primary filter cartridge 300 is shown in the 3$^{rd}$ drawing set (FIGS. 3A-3C). The cartridge 300 comprises filtering media 310 having a cylindrical outer radial surface 311, a cylindrical inner radial surface 312, a first axial edge 313, and a second axial edge 314. (FIG. 3A.) The first axial edge 313, and the adjacent region of the filtering media 310, form a first end portion 315. The second axial edge 314, and the adjacent regions of the media 310, form a second end portion 316.

The filtering media 310 can made from any material which is porous to air (or the other gas to be filtered) and non-porous to the particulate matter suspended therein. For example, chemically-treated paper can be folded into a plurality of longitudinal pleats and/or compiled into a cylindrical shape. The cylindrical shape may be maintained by an outer structure (e.g., polyester twine wrapped and glued to the pleats' radially-outer peaks) and/or an inner structure.

The primary filter cartridge 300 further comprises a first end cap 320 and a second end cap 390. (FIG. 3A.) The first end cap 320 can be a plastic-molded and/or one-piece element that is adhesively or otherwise secured to the first end portion 315 of the filtering media 310. The cap 320 can have, for example, an annular wall 321 with a notched opening 322 that seats against, and seals the first axial edge 313 of the filter media 310. (FIGS. 3A and 3B.) A rim 323 can extend axially from the annular wall 321 (i.e., from its outer radial edge) in the first direction and second directions, and a canopy 324 can extend radially inwardly therefrom. In the filter assembly 100, the first end cap 320 is (and more particularly its rim 323 and canopy 324 are) situated within the cradle 235 (shown in FIG. 2C) in the housing's first cover 230.

The second end cap 390 (FIG. 3C) can be plastic and/or one-piece element that is molded directly to, or otherwise secured, to the second end portion 316 of the filtering media 310. The end cap 390 can comprise a circular wall 391 that seals the second axial edge 314 of the filtering media 310 and also the circular opening defined thereby. Circularly-arranged ribs 393 (aligned roughly with the inner radial surface 312 of the filtering media 310) can project axially from the wall 391 in the first direction and circularly-arranged ribs 394 can project from the wall 391 in the second direction. The end cap 390 can further comprise a notched rim 395 extending axially from the circular wall 391 in the first direction. In the filter assembly 100, the end cap 390 is inserted within the pocket 255 (See FIG. 2H) in the housing cover 250, and its wall 251 compresses the ribs 394 to securely hold the primary filter cartridge 300 in place.

Figure 4F:
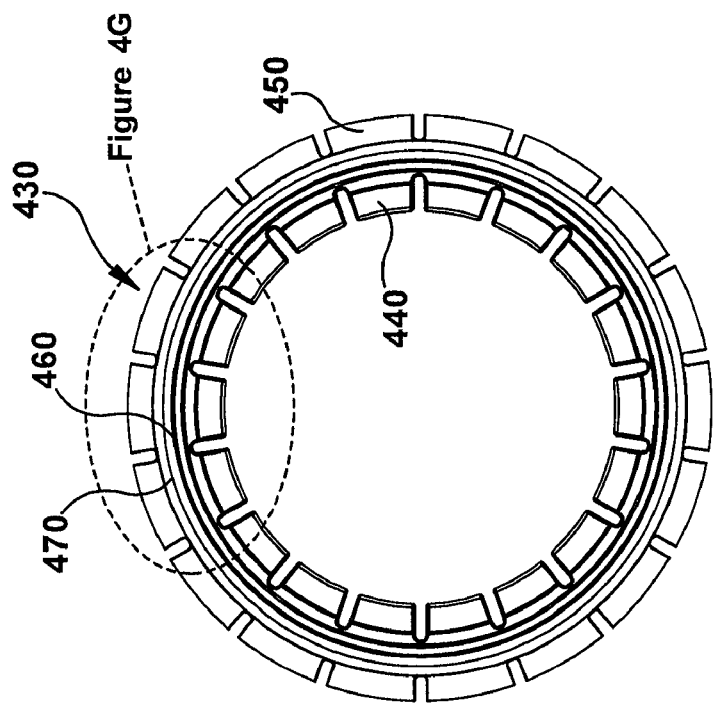
Figure 4D:
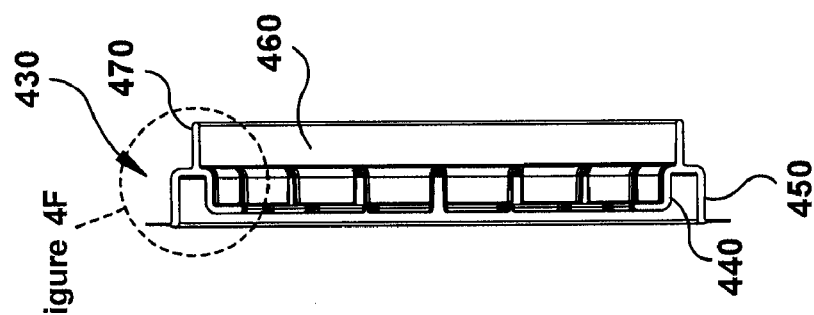
Figure 4E:
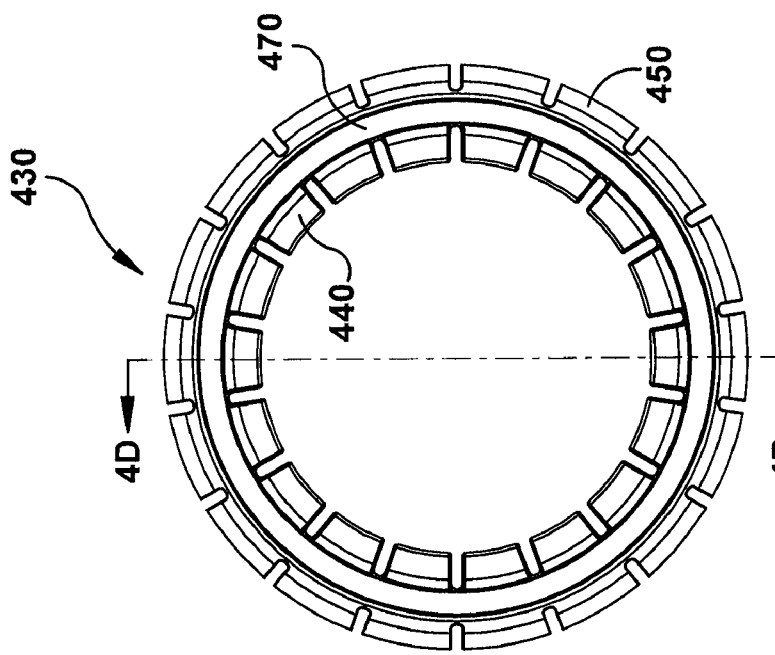

The secondary filter cartridge 400 is shown in the 4$^{th}$ drawing set (FIGS. 4A-4J), and like the primary filter cartridge 300, it includes a filtering media 410 having a cylindrical shape. Specifically, the filtering media 410 has an outer radial surface 411 (defining a diameter less than that defined by the inner radial surface 312 of the primary filtering media 310), an inner radial surface 412, a first axial edge 413, and a second axial edge 414. (FIG. 4A.) The axial edges 413 and 414, and respective adjacent regions of the filtering media, form end portions 415 and 416, respectively. The secondary filtering media 410, like primary filtering media 310, can be made from an air-porous material (e.g., paper), pleated and formed into a cylindrical shape.

The secondary filter cartridge 400 has a first end cap 420 that like the end cap 320 of the primary filter cartridge 420, seals the adjacent axial edge 413 of the filtering media 410. But the end cap 420 is adapted to not only perform this sealing service, but also independently mount the cartridge 400 to, and independently seal the cartridge 400 against, the housing 200. It is these further features of the end cap 420 that allows the filter assembly 100 to function with only the secondary filter cartridge 400 in emergency situations. (See e.g., FIG. 1B.)

To this end, the first end cap 420 comprises a rigid adaptor ring 430 (See FIG. 4F). The ring 430 can include an annular shelf 440 (with ledges 441 and 442, see FIG. 4H), an annular clip 450 (with a skirt 451 and a flange 452), a collar 460, and a connection ridge 470. The shelf 440, the clip 450, the collar 460, and the ridge 470 are formed in one piece (e.g., molded) and/or are otherwise connected together to form a continuous structure. The shelf's ledges 441/442, the clip's skirt 451, the collar 460, and the ridge 470 can all have substantially the same thickness (in cross-section), with the clip's flange 452 being somewhat thinner.

In the illustrated ring 430 (FIGS. 4F and 4H), the shelf's ledge 441 extends radially and its ledge 442 extends axially (i.e., perpendicularly) from the outer-radial end of the ledge 442. The ridge 470 extends radially outward from the second axial end of the shelf's ledge 442. The clip's skirt 451 extends axially, in the first direction, from the outer-radial end of the ridge 470, and the clip's flange 452 extends radially outward from the skirt's first axial end. The collar 460 extends axially, in the second direction, from a radially intermediate region of the ridge 470. The clip's skirt 451 and the ridge 470 define a circular moat 471 (with an open first axial end) around the shelf's ledge 442, and the collar 460 and the ridge 470 define a circular trench 472 (with an open second axial end) around the first end portion 415 of the filtering media.

The shelf 440 essentially forms a corner seat for the filtering media 410, with the ledge 441 abutting against the media's first axial edge 413 and the ledge 442 abutting against the neighboring region of its outer radial surface 411. The shelf 440 and/or the ledges 441/442 can comprise circumferential ledge segments 443 separated by slots 444. Such segmented-shelf geometry may facilitate the tight seating of the end portion 415 of the filter media 410 during cartridge fabrication. Also, preferably, the slots 444 extend axially and radially into the connection 470 (but stop short of the collar 460), to facilitate sealing steps introduced below.

The clip 450 is the "hooking" component that attaches the secondary filter cartridge 400 to the housing 200 in the filter assembly 100. More particularly, the clip 450 is received within the housing channel 245 (See FIG. 2E) in the outlet duct 240. To insure a tight almost-interference fit within the channel 245, the flange 452 can comprise circumferential flange segments 453 separated by radial slots 454. The reduced cross-sectional thickness of the flange 452 (compared to the rest of the adaptor ring 430) can also facilitate this fit.

The first end cap 420 further comprises a molded seal structure 480 (See FIG. 4I) that encapsulates the shelf 440 and the first end portion 415 of the filtering media 410. Specifically, for example, the seal structure 480 can comprise a radial-outward portion 481 (encapsulating an end region of the media's outer radial surface 411), a shelf-surrounding portion 482 (encapsulating the shelf 440), and radial-inward portion 483 (that encapsulates an end region of the media's inner radial surface 412).

Figure 4H:
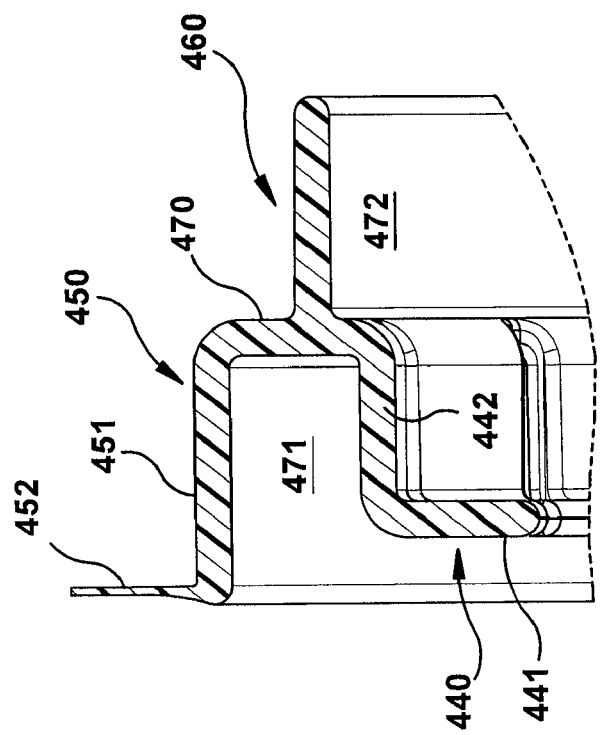
Figure 4G:
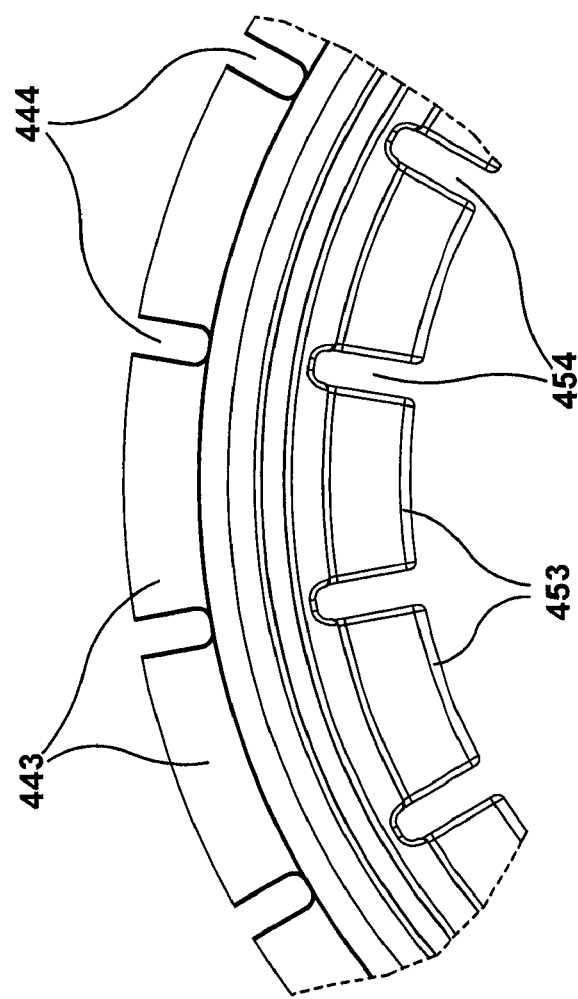
Figure 4J:
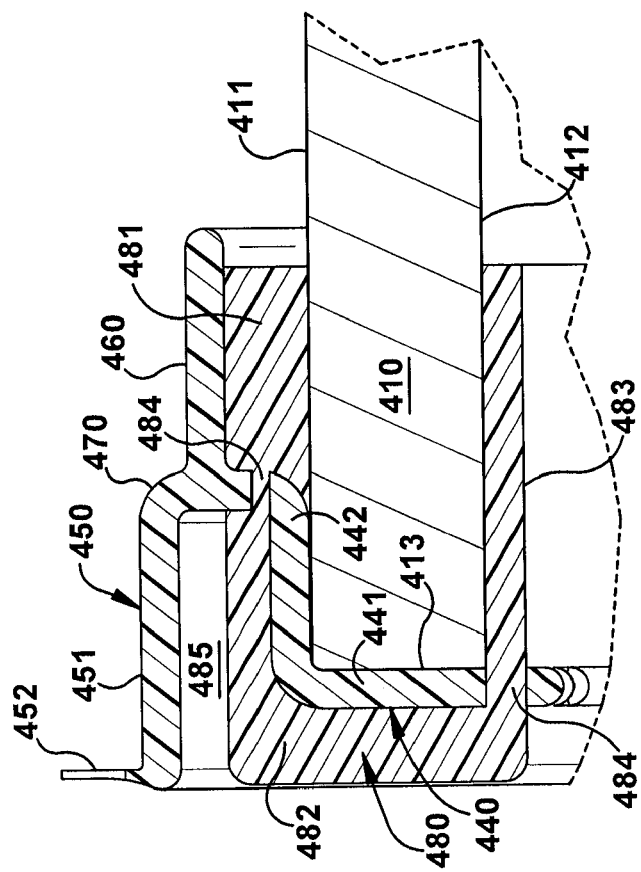
Figure 4I:
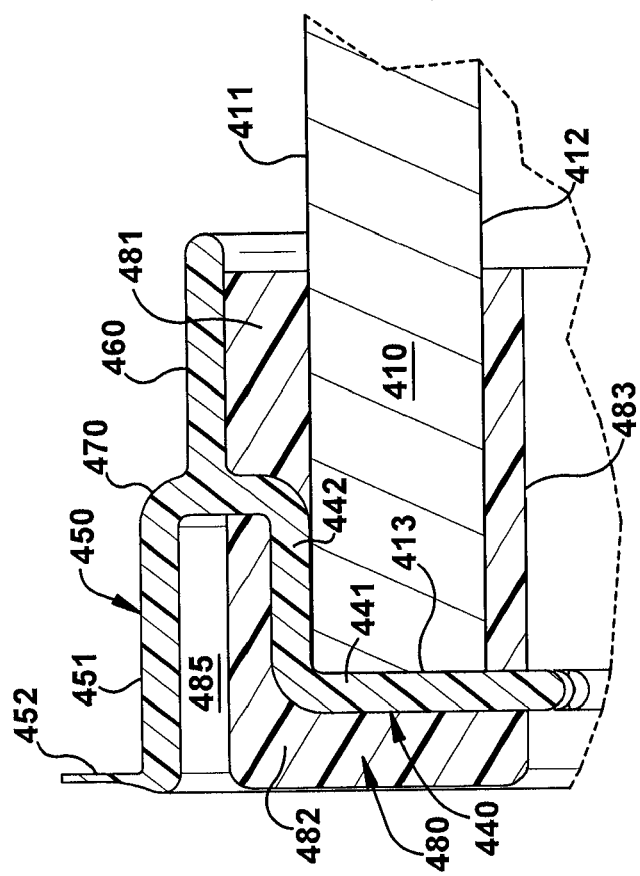

Referring now to FIGS. 4H-4J, the radial-outward portion 481 at least partially fills, and preferably completely fills the collar-ridge trench 472. The shelf-surrounding portion 482 occupies only a radially inward region of the skirt-ridge moat 471, this portion 482 does not occupy the moat's radially outward (i.e., clip-adjacent) region, thereby forming a furrow 485 in the adaptor ring 230. The clip 450 is not encapsulated by the seal structure 480, whereby it remains available for receipt in the housing channel 245.

The molded seal structure 480 can be formed in one piece, if the adaptor ring 430 is appropriately slotted or otherwise featured. Specifically, for example, the seal structure 480 can further include tendon portions 484 (See FIG. 4J) that extend through the slots 444 in the shelf 440 to connect the portions 481 and 482. (The seal portions 482 and 483 can be connected outside adaptor ring 430 and along a corner surrounding the radial-inward end of the ledge 441.)

The secondary filter cartridge 400 further comprises a second end cap 490 that can be similar to the end cap 390 of the primary filter cartridge 300. (FIGS. 4A and 4C.) Specifically, for example, the end cap 490 can be a plastic and/or one-piece element that is molded directly to, or otherwise secured, to the second end portion 416 of the filtering media 410. It can comprise a circular wall 491 (with inward ribs 493, outward ribs 494, and a rim 495) that seals the second axial edge 414 of the filtering media 410 and also the circular opening defined thereby. In the filter assembly 100, the end cap 490 is situated inside the primary-filter-cartridge 300, with its ribs 494 compressed against the circular wall 391 of the second end cap 390.

To assemble the filter 100 for normal operation (FIG. 1A), the cover 250 is removed from the sleeve 210. The secondary filter cartridge 400 is situated within the sleeve 210 so that is clip 450 is received within the channel 245. In the illustrated embodiment, the shelf ledge 442 and the clip skirt 451 straddle the fence 246 and the fence 246 is situated within the furrow 485. The primary filter cartridge 300 is then also situated within the sleeve 210, around the secondary filter cartridge 400, with its first end cap 320 received within the cradle 235. The second cover 250 is then clamped over the open end of the sleeve 210 to close the housing 200 (and thereby inserting the second end cap 390 of the first filter cartridge 300 into the pocket 255).

If one-cartridge operation (FIG. 1B) becomes necessary, the filter assembly 100 can be quickly and easily converted for such operation. Specifically, housing 200 is opened (e.g., the cover 250 is unclamped from the sleeve 210), the primary filter cartridge 300 is removed, and the housing 200 is closed (e.g., the cover 250 is re-clamped to the sleeve 210). The filter assembly 100 is then ready for one-cartridge operation. No further assembly or manipulation of the filter 100 is necessary.

Although the filter assembly 100, the secondary filter cartridge 300, the end cap 320, the adaptor ring 430, and/or the seal structure 480 have been shown and described with respect to a certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A filter cartridge comprising:
   filtering media having an outer radial surface, an inner radial surface defining a fluid chamber, a first axial edge, and a second axial edge;
   a first end cap having an axially inward side and an axially outward side and comprising a rigid adaptor ring and a seal structure;
      wherein the rigid adaptor includes an annular shelf on which the first axial edge of the filtering media sits and an axially and outwardly protruding annular clip situated radially and axially outward from the filtering media;
      wherein the seal structure encapsulates the shelf and a first end portion of the filter media including its first axial end and adjacent regions of the inner and outer radial surfaces; and
      wherein the clip is not encapsulated by the seal structure whereby it is available for insertion into a housing channel.

2. A filter cartridge as set forth in claim 1, further comprising a second cap sealing the second axial edge of the filtering media and closing a second axial end of the fluid chamber.

3. A filter cartridge as set forth in claim 1, wherein the shelf and the clip are formed in one-piece.

4. A filter cartridge as set forth in claim 1, wherein the shelf comprises a ledge situated flush against the first axial edge of the filtering media and another ledge perpendicular thereto situated flush against the outer radial surface of the filtering media.

5. A filter cartridge as set forth in claim 4, wherein the shelf comprises circumferential ledge segments separated by radial slots.

6. A filter cartridge as set forth in claim 1, wherein the clip comprises an annular skirt situated radially outward from the shelf and extends away therefrom in the axially outward direction.

7. A filter cartridge as set forth in claim 6, wherein the clip comprises an annular flange extending radially outward from the distal edge of the skirt.

8. A filter cartridge as set forth in claim 7, wherein the flange comprises circumferential flange segments separated by radial slots.

9. A filter cartridge as set forth in claim 6, wherein the shelf and the skirt define an annular channel therebetween on the axially outward side and wherein the seal structure occupies a radially inward region, but not a radially outward, region of this channel.

10. A filter cartridge as set forth in claim 1, wherein the adaptor ring further comprises an annular collar surrounding the first end portion.

11. A filter cartridge as set forth in claim 10, wherein the collar is situated radially outward from the outer radial surface of the filtering media and extends axially away from the shelf in a direction towards the second axial edge of the filtering media.

12. A filter cartridge as set forth in claim 10, wherein the outer radial surface of the filtering media and the collar define an annular trench therebetween on the axially inward side, and wherein the seal structure occupies this trench.

13. A filter cartridge as set forth in claim 10, wherein the shelf, the clip, and the collar are formed in one piece.

14. A filter cartridge as set forth in claim 10, wherein the adaptor ring further comprises an annular transition ridge connecting the shelf, the collar and the clip, and wherein the shelf, the collar, the clip, and the ridge are formed in one-piece.

15. A filter cartridge as set forth in claim 10, wherein the shelf comprises a ledge situated flush against the first axial edge of the filtering media and another ledge perpendicular thereto situated flush against the outer radial surface of the filtering media;
wherein the clip comprises an annular skirt extending in the radially outward direction and an annular flange extending radially outward from the distal edge of the skirt;
wherein the shelf and the skirt define a moat therebetween on the axially outward side and wherein the seal structure occupies a radially inward region, but not a radially outward, region of this moat;
wherein the outer radial surface of the filtering media and the collar define an annular trench therebetween on the axially inward side, and wherein the seal structure occupies this trench.

16. A filter cartridge as set forth in claim 15, wherein the shelf comprises circumferential ledge segments separated by radial slots and wherein the clip comprises circumferential flange segments separated by radial slots.

17. A filter cartridge as set forth in claim 15, wherein the adaptor ring further comprises an annular transition ridge connecting the shelf, the collar and the clip, and wherein the shelf, the collar, the clip, and the ridge are formed in one-piece.

18. A filter cartridge as set forth in claim 1 and a housing having a clip-receiving channel, wherein the clip is inserted into the housing channel.

19. A filter cartridge as set forth in claim 18 functioning as a secondary filter cartridge, a housing having a channel in which the clip is inserted, and a primary filter cartridge, assembled together to form a filter assembly, wherein the secondary filter cartridge is mounted and sealed relative to the housing independently of the primary filter cartridge, whereby the filter assembly can be operated without the primary filter cartridge in emergency situations.

20. A filter cartridge comprising:
filtering media having an outer radial surface, an inner radial surface defining a fluid chamber, a first axial edge, and a second axial edge;
a first end cap having an axially inward side and an axially outward side and comprising a rigid adaptor ring and a seal structure;
wherein the rigid adaptor includes an annular shelf on which the first axial edge of the filtering media sits and an axially and outwardly protruding annular clip situated radially and axially outwardly from the filtering media and spaced radially outwardly from the seal structure,
wherein the seal structure and the clip define a furrow to receive an annular housing fence.

* * * * *